United States Patent
Lee et al.

(10) Patent No.: US 10,606,594 B2
(45) Date of Patent: Mar. 31, 2020

(54) METHOD AND APPARATUS FOR EXECUTING MULTI-THREAD USING MASK VALUE

(71) Applicant: SAMSUNG ELECTRONICS CO., LTD., Suwon-si (KR)

(72) Inventors: Jin-seok Lee, Seoul (KR); Dong-kwan Suh, Yongin-si (KR); Seung-won Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 310 days.

(21) Appl. No.: 14/957,912

(22) Filed: Dec. 3, 2015

(65) Prior Publication Data
US 2016/0162295 A1 Jun. 9, 2016

(30) Foreign Application Priority Data
Dec. 3, 2014 (KR) .................. 10-2014-0172380

(51) Int. Cl.
*G06F 9/30* (2018.01)
*G06F 9/38* (2018.01)

(52) U.S. Cl.
CPC ........ *G06F 9/30072* (2013.01); *G06F 9/3009* (2013.01); *G06F 9/30145* (2013.01); *G06F 9/3851* (2013.01); *G06F 9/3853* (2013.01)

(58) Field of Classification Search
CPC .. G06F 9/30072; G06F 9/3009; G06F 9/3016; G06F 9/30145; G06F 9/3822; G06F 9/3851; G06F 9/93853; G06F 9/3853; G06F 9/3004
See application file for complete search history.

(56) References Cited

U.S. PATENT DOCUMENTS

| | | | | |
|---|---|---|---|---|
| 7,353,369 B1* | 4/2008 | Coon | .................. | G06F 9/30101 712/220 |
| 7,634,637 B1* | 12/2009 | Lindholm | ............. | G06F 9/3851 712/13 |
| 7,877,585 B1 | 1/2011 | Coon et al. | | |
| 8,074,224 B1* | 12/2011 | Nordquist | ............. | G06F 9/3012 712/20 |
| 2013/0042090 A1* | 2/2013 | Krashinsky | ........... | G06F 9/3016 712/214 |
| 2014/0164737 A1* | 6/2014 | Collange | ............. | G06F 9/30072 712/205 |
| 2014/0165049 A1 | 6/2014 | Diamos et al. | | |

OTHER PUBLICATIONS

Brunie et al., Simultaneous Branch and Warp Interweaving for Sustained GPU Performance, 2012, IEEE.*
El Tantawy et al., "A Scalable Multi-Path Microarchitecture for Efficient GPU Control Flow", 2014, IEEE.*
Lin et al., "An Efficient VLIW DSP Architecture for Baseband Processing", IEEE, 2003. (Year: 2003).*

* cited by examiner

*Primary Examiner* — Benjamin P Geib
(74) *Attorney, Agent, or Firm* — Sughrue Mion, PLLC

(57) ABSTRACT

A method of executing, by a processor, a multi-thread including threads of the processor, includes setting a mask value indicating execution of one of the threads of the processor based on an instruction, setting an inverted mask value based on the set mask value; and executing the thread of the processor based on the set mask value and the set inverted mask value.

16 Claims, 8 Drawing Sheets

METHOD AND APPARATUS FOR EXECUTING MULTI-THREAD USING MASK VALUE

CROSS-REFERENCE TO RELATED APPLICATION

This application claims priority to Korean Patent Application No. 10-2014-0172380, filed on Dec. 3, 2014, in the Korean Intellectual Property Office, the disclosure of which is incorporated herein in its entirety by reference.

BACKGROUND

1. Field

The exemplary embodiments disclosed herein relate to methods and apparatuses for executing a multi-thread.

2. Description of the Related Art

A single-instruction multiple-thread (SIMT) architecture improves computing performance by executing several threads by using one instruction. Generally, performance improves when one instruction is executed by each thread. In this case, since the threads use the same code, the threads may share the instruction by reading the instruction from a memory, and since the threads are executed at the same time, high performance may be achieved compared to using a number of processors. Also, the threads may be synchronized and processed together such that the instruction is read once and shared. However, each thread does not always necessarily perform only a single instruction. If one of the threads is unable to immediately perform an instruction for any reason, a program may proceed with respect to other threads.

SUMMARY

Provided are methods and apparatuses for executing a multi-thread. Also, provided are non-transitory computer-readable recording media having recorded thereon a program, which when executed by a computer, performs the methods.

Additional aspects will be set forth in part in the description which follows and, in part, will be apparent from the description, or may be learned by practice of the presented exemplary embodiments.

According to an aspect of an exemplary embodiment, there is provided a method of executing, by a processor, a multi-thread including threads of the processor, the method including: setting a mask value indicating execution of one of the threads of the processor, based on an instruction; setting an inverted mask value based on the set mask value; and executing the thread of the processor based on the set mask value and the set inverted mask value.

The instruction may include a group code in which certain instructions satisfying a predetermined criteria are grouped, an operation (OP) code comprising bits indicating the instruction, and cycle information indicating a cycle to which a mask is to be applied.

The setting of the mask value may include setting the mask value based on all of the group code, the OP code, and the cycle information.

The executing of the thread may include executing the thread of the processor based on the set mask value or the set inverted mask value during the cycle indicated by the cycle information.

The method may further include storing the set mask value and the set inverted mask value.

The executing of the thread may include executing the thread of the processor based on the stored mask value and the stored inverted mask value.

The method may further include deleting the stored mask value and the stored inverted mask value after executing the thread.

The instruction may include a very long instruction word (VLIW).

A quantity of the threads of the processor may be 16 threads or less.

According to an aspect of another exemplary embodiment, there is provide an apparatus configured to execute a multi-thread comprising threads of a processor, the apparatus including: a controller configured to set a mask value indicating execution of one of the threads of the processor, based on an instruction, and to set an inverted mask value based on the set mask value; and an executer configured to execute the thread of the processor based on the set mask value and the set inverted mask value.

The instruction may include a group code in which instructions satisfying a predetermined criteria are grouped, an operation (OP) code comprising bits indicating the instruction, and cycle information indicating a cycle to which a mask is to be applied.

The controller may be configured to set the mask value based on the group code, the OP code, and the cycle information.

The executer may be configured to execute the thread of the processor based on the set mask value or the set inverted mask value during the cycle indicated by the cycle information.

The apparatus may further include a storage configured to store the set mask value and the set inverted mask value.

The executer may be configured to execute the thread of the processor based on the stored mask value and the stored inverted mask value.

The controller may be configured to delete the stored mask value and the stored inverted mask value.

The instruction may include a very long instruction word (VLIW).

A quantity of the threads of the processor may be 16 threads or less.

According to another aspect of an exemplary embodiment, there is provided a non-transitory computer-readable recording medium having recorded thereon a program which, when executed by a computer, performs a method of executing, by a processor connected to the computer, a multi-thread including threads of the processor, the method including: setting a mask value indicating execution of one of the threads of the processor, based on an instruction; setting an inverted mask value based on the set mask value; and executing the thread of the processor based on the set mask value and the set inverted mask value.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
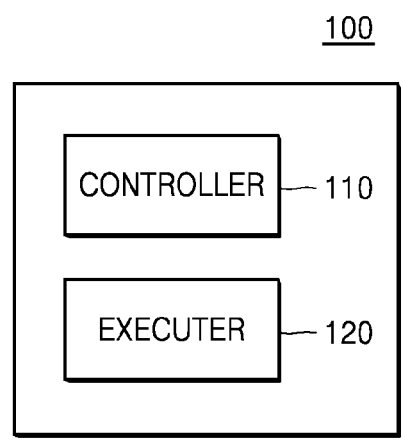
FIG. 1 is a block diagram of an apparatus for executing a multi-thread, according to an exemplary embodiment.

Advantages and features of one or more exemplary embodiments and methods of accomplishing the same may be understood more readily by reference to the following detailed description of the exemplary embodiments and the accompanying drawings. In this regard, the present exemplary embodiments may have different forms and should not be construed as being limited to the descriptions set forth herein. Rather, these exemplary embodiments are provided so that this disclosure will be thorough and complete and will fully convey the concept of the exemplary embodiments to one of ordinary skill in the art, and the exemplary embodiments will only be defined by the appended claims.

Hereinafter, the terms used in the specification will be briefly defined, and the exemplary embodiments will be described in detail.

All terms including descriptive or technical terms which are used herein should be construed as having meanings that are understood by one of ordinary skill in the art. However, the terms may have different meanings according to the intention of one of ordinary skill in the art, precedent cases, or the appearance of new technologies. Also, some terms may be arbitrarily selected by the Applicant, and in this case, the meaning of the selected terms will be described in detail in the detailed description. Thus, the terms used herein have to be defined based on the meaning of the terms together with the description throughout the specification.

When a part is described as "including" or "comprising" an element, unless there is a particular description contrary thereto, the part can further include other elements, not excluding the other elements. Also, the term "unit" in the exemplary embodiments may refer to a software component or hardware component such as a field-programmable gate array (FPGA) or an application-specific integrated circuit (ASIC), and may perform a specific function. However, the term "unit" is not limited to software or hardware. The "unit" may be formed so as to be implemented in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

As used herein, the term "and/or" includes any and all combinations of one or more of the associated listed items.

Reference will now be made in detail to exemplary embodiments, examples of which are illustrated in the accompanying drawings. In this regard, the present exemplary embodiments may have different forms and should not be construed as being limited to the descriptions set forth herein. In the following description, well-known functions or constructions are not described in detail so as not to obscure the exemplary embodiments with unnecessary detail.

FIG. 1 is a block diagram of an apparatus 100 for executing a multi-thread, according to an exemplary embodiment. Referring to FIG. 1, the apparatus 100 includes a controller 110 and an executer 120.

The controller 110 may set a mask value indicating execution of a thread of a processor, by using an instruction. Also, the controller 110 may set an inverted mask value by using the set mask value. The instruction may include a group code, an operation (OP) code, and cycle information. The controller 110 may set the mask value by using the group code, the OP code, and the cycle information. The instruction may be a very long instruction word (VLIW). The instruction is obtained by making one word by grouping several instructions such that the several instructions are performed together. The number of threads (the quantity of threads) of the processor may be less than or equal to 16, although is not limited thereto, and it is understood that the number of threads of the processor may be greater than 16 according to other exemplary embodiments.

The executer 120 may execute the thread of the processor by using the set mask value or the set inverted mask value. The executer 120 may execute the thread of the processor by using the set mask value or the set inverted mask value during a cycle corresponding to the cycle information.

Figure 2:
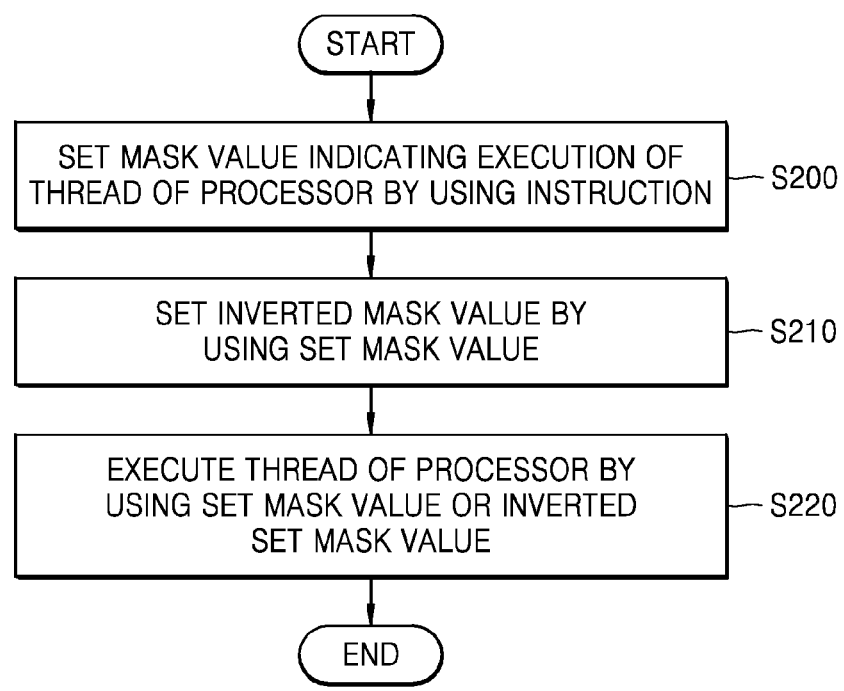
FIG. 2 is a flowchart of a method of executing a multi-thread, according to an exemplary embodiment.

FIG. 2 is a flowchart of a method of executing a multi-thread, according to an exemplary embodiment.

In operation S200, the apparatus 100 may set a mask value indicating execution of a thread of a processor by using an instruction. The instruction may include a group code, an OP code, and cycle information. The apparatus 100 may set the mask value by using the group code, the OP code, and the cycle information. The instruction may include VLIW. Also, the number of threads of the processor may be less than or equal to 16, although is not limited thereto.

In operation S210, the apparatus 100 may set an inverted mask value by using the set mask value.

In operation S220, the apparatus 100 may execute the thread of the processor by using the set mask value or the set inverted mask value. The apparatus 100 may execute the thread of the processor by using the set mask value or the set inverted mask value during a cycle corresponding to the cycle information.

Figure 3:
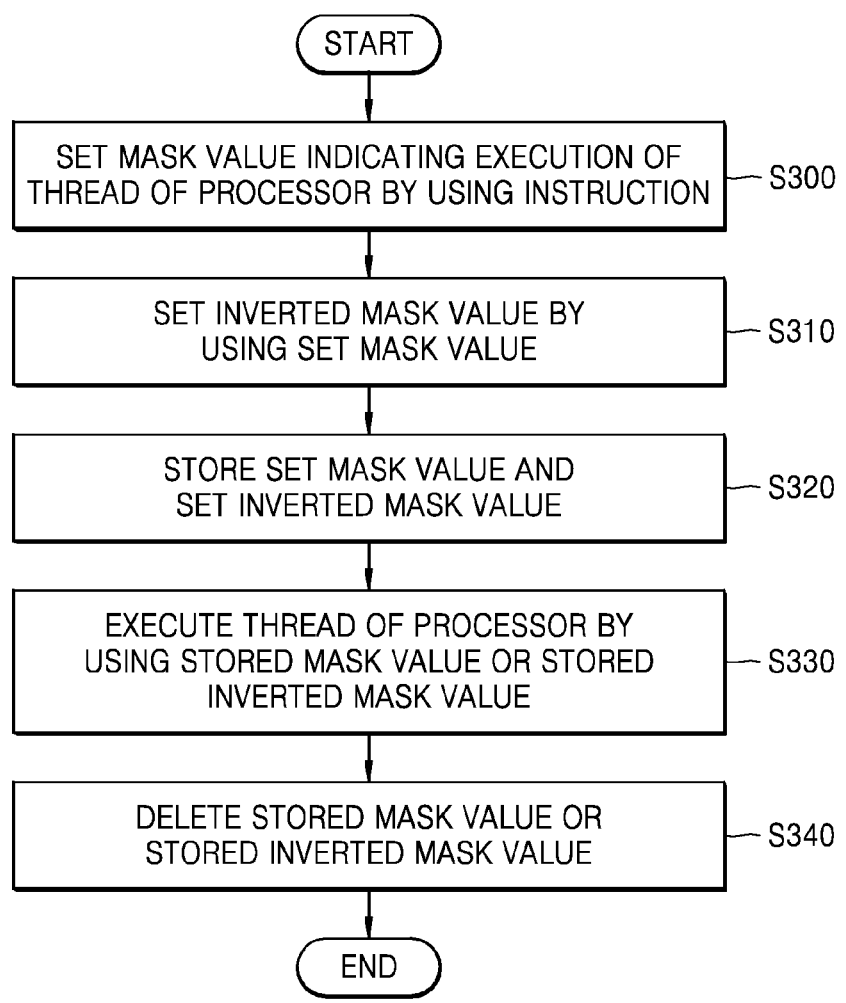
FIG. 3 is a flowchart of a method of executing a multi-thread, according to another exemplary embodiment.

FIG. 3 is a flowchart of a method of executing a multi-thread, according to another exemplary embodiment.

In operation S300, the apparatus 100 may set a mask value indicating execution of a thread of a processor, by using an instruction. The instruction may include a group code, an OP code, and cycle information. The apparatus 100 may set the mask value by using the group code, the OP code, and the cycle information. The instruction may include VLIW. Also, the number of threads of the processor may be less than or equal to 16, although is not limited thereto.

In operation S310, the apparatus 100 may set an inverted mask value by using the set mask value.

In operation S320, the set mask value and the set inverted mask value may be stored.

In operation S330, the apparatus 100 may execute the thread of the processor by using the stored mask value or the set inverted mask value. The apparatus 100 may execute the thread of the processor by using the stored mask value or the stored inverted mask value. The apparatus 100 may execute the thread of the processor by using the stored mask value or the stored inverted mask value during a cycle corresponding to the cycle information.

In operation S340, the stored mask value and the stored inverted mask value may be deleted.

The methods of FIGS. 2 and 3 will now be described in detail with reference to FIGS. 4 through 7.

Figure 4:
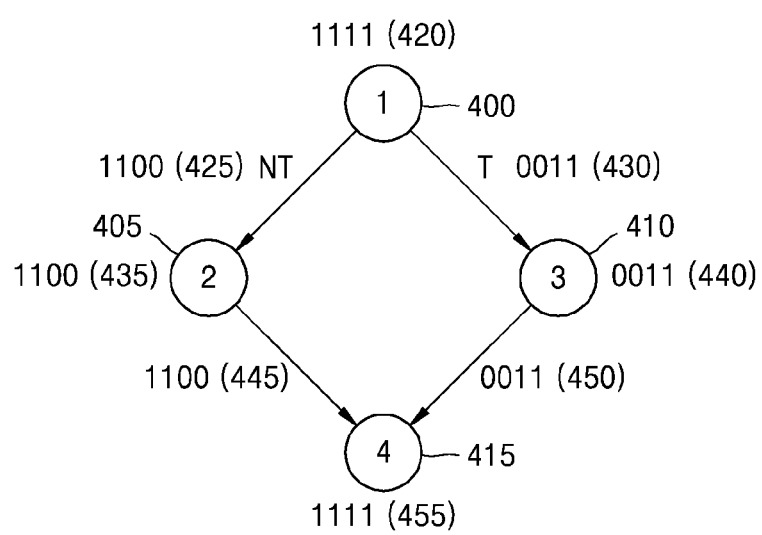
FIG. 4 is a diagram for describing a method of executing a multi-thread.

FIG. 4 is a diagram for describing a method of executing a multi-thread.

Referring to FIG. 4, a first basic block 400 has a mask value 420 of '1111'. Four numbers in the mask value 420 indicate whether four threads may be executed. A mask value '1' indicates that a thread is executed, and a mask value '0' indicates that a thread is not executed. The first basic block 400 of FIG. 4 has branches. For example, a branch T is a taken path and may denote 'if'. Also, a branch NT is a non-taken path and may denote 'if not'. A branch may either be a taken path, e.g., the branch T, or a non-taken path, e.g., the branch NT. When the first basic block 400 is branched to a third basic block 410, the branch T may have a mask value 430 of '0011'. Also, when the first basic block 400 is branched to a second basic block 405, the branch NT may have a mask value 425 of '1100'. In other words, the mask value 430 of '0011' has an inverted value '1100' of the mask value 425. The third basic block 410 has a mask value 440 of '0011', and the second basic block 405 has a mask value 435 of '1100'. Accordingly, the second basic block 405 executes threads 1 and 2, and the third basic block 410 executes threads 3 and 4. Also, since the second and third basic blocks 405 and 410 do not have a branch, the mask values 435 and 440 are not changed. Accordingly, when the second basic block 405 moves to a fourth basic block 415, a path has a mask value 445 of '1100'. Also, when the third basic block 410 moves to the fourth basic block 415, a path has a mask value 450 of '0011'. Then, the fourth basic block 415 has a mask value 455 of '1111' as the mask value 455 of '1100' and the mask value 450 of '0011' are added. Accordingly, the fourth basic block 415 executes all threads.

Figure 5:
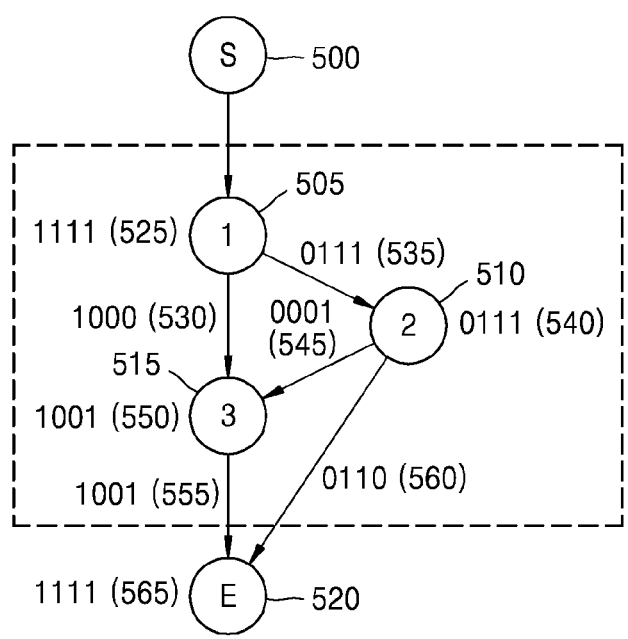
FIG. 5 is a diagram for describing a problem when a multi-thread is executed.

FIG. 5 is a diagram for describing a problem when a multi-thread is executed.

Referring to FIG. 5, the first basic block 505 has a mask value 525 of '1111'. The first basic block 505 has branches. Accordingly, when the first basic block 505 moves to a second basic block 510, the branch has a mask value 535 of '0111'. Also, when the first basic block 505 moves to a third basic block 515, the branch has a mask value 530 of '1000'. Accordingly, the second basic block 510 has a mask value 540 of '0111'. The second basic block 510 has branches. Accordingly, when the second basic block 510 moves to the third basic block 515, the branch has a mask value 545 of '0111'. Also, when the second basic block 510 moves to an end basic block 520, the branch has a mask value 560 of '0110'. The third basic block 515 has a mask value 550 of '1001' as the mask value 530 of '1000' from the start basic block 550 and the mask value 545 of '0001' from the second basic block 510 are added. The end basic block 520 has a mask value 565 of '1111' as a mask value 555 of '1001' from the third basic block 515 and the mask value 560 of '0110' from the second basic block 510 are added. The first through third basic blocks 505 through 515 form one branch. However, since two basic blocks, i.e., the second and third basic blocks 510 and 515, move to the end basic block 520, the multi-thread has a code having an unstructured control flow. The third basic block 515 executes threads 1 and 4. However, when basic blocks are executed by using a stack, only the thread 4 is executed as the mask value 545 of '0001' is applied to the third basic block 515 after the second basic block 510 is executed.

Figure 6:
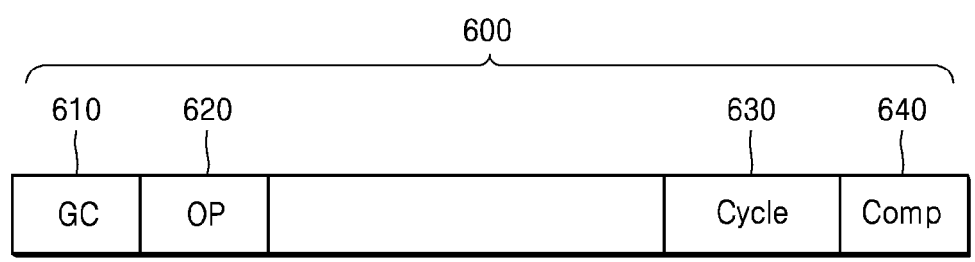
FIG. 6 is a diagram for describing a method of executing a multi-thread, according to an exemplary embodiment.

FIG. 6 is a diagram for describing a method of executing a multi-thread, according to an exemplary embodiment. Referring to FIG. 6, an instruction 600 includes a group code 610, an OP code 620, a cycle 630 to which a mask is to be applied, and a compression method 640. The group code 610 denotes a code in which similar instructions are grouped. For example, operators, such as 'add' and 'sub', may be in the same group code. It is understood that the exemplary embodiments are not limited to the operators 'add' and 'sub'. Also, it is understood that the determination of whether instructions are "similar" may be made according to many different criteria, for example, whether the instructions are operators, whether the instructions each satisfy a predetermined criteria, etc. The OP code 620 are bits indicating an instruction. For example, 'add' may be indicated by 0x10 and 'sub' may be indicated by 0x11. When instructions are simultaneously executed, there may be an instruction that is not executed ('nop'). In this case, an instruction that occupies an instruction memory is removed via the compression method 640. For example, when there are instructions executed according to 'add nop nop nop', three 'nop' do not function but occupy 4×3 bytes in the instruction memory. When the last bit of 'add' is a compression bit and 'add and compression bit 1 bit' is set, the last bit of 'add' is recognized and changed to 'nop'. Thus, a loss of 12 bytes caused by 'nop' may be prevented.

The apparatus 100 may set a mask value indicating execution of a thread of a processor by using the group code 610, the OP code 620, and the cycle 630. Also, the apparatus 100 may set the mask value by further using the compression method 640. The apparatus 100 may assign an instruction for setting a mask value as a mask set (MS). Also, the apparatus 100 may store the set mask value in a mask pool generator. The apparatus 100 may set an inverted mask value by using the group code 610, the OP code 620, the cycle 630, and the set mask value. Also, the apparatus 100 may set the inverted mask value by further using the compression method 640. The apparatus 100 may assign an instruction for setting an inverted mask value as a mask inverter set (MIS). Also, the apparatus 100 may store the set inverted mask value in the mask pool generator. The apparatus 100 may assign an instruction for storing a mask value in a mask pool generator as a predicate (PRED), which may be, for example, a function that returns true or false depending on whether inputs of the function satisfy a predetermined condition. The apparatus 100 may apply the set mask value or the set inverted mask value as a current mask value. The apparatus 100 may assign an instruction for reading and applying a mask value as a mask get (MG). Also, the apparatus 100 may execute a thread by using the set mask value or the set inverted mask value.

Figure 7:
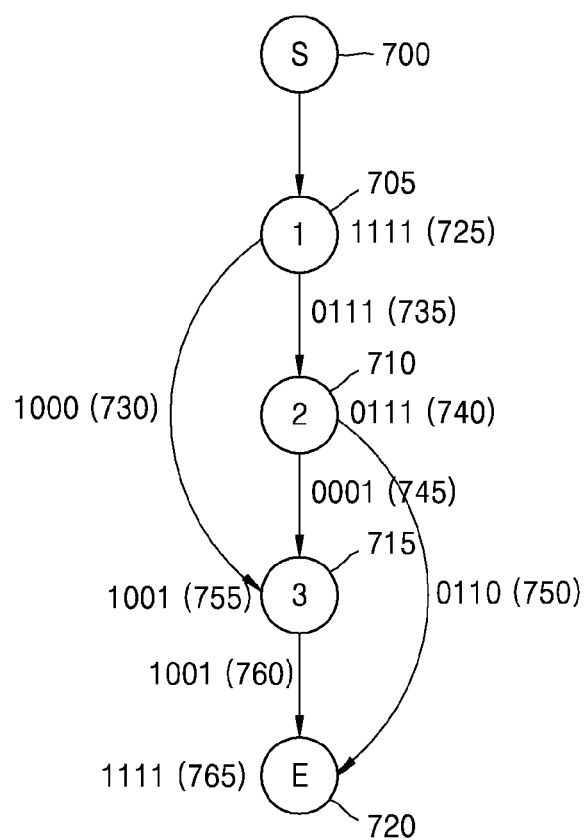
FIG. 7 is an exemplary diagram for describing a method of executing a multi-thread, according to an exemplary embodiment.

FIG. 7 is an exemplary diagram for describing a method of executing a multi-thread, according to an exemplary embodiment. Referring to FIG. 7, a start basic block 700 moves to a first basic block 705. The first basic block 705 has a mask value 725 of '1111'. The first basic block 705 has branches. Accordingly, when the first basic block 705 moves to a second basic block 710, the branch has a mask value 735 of '0111'. Also, when the first basic block 705 moves to a third basic block 715, the branch has a mask value 730 of '1000'. Accordingly, the second basic block 710 has a mask value 740 of '0111'. The second basic block 710 has branches. Accordingly, when the second basic block 710 moves to the third basic block 715, the branch has a mask value 745 of '0001'. Also, when the second basic block 710 moves to an end basic block 720, the branch has a mask value 750 of '0110'. The third basic block 715 has a mask value 755 of '1001' as the mask value 730 of '1000' from the first basic block 705 and the mask value 745 of '0001' from the second basic block 710 are added. The end basic block 720 has a mask value 765 of '1111' as a mask value 760 of '1001' from the third basic block 715 and the mask value 750 of '0110' from the second basic block 710 are added.

A compiler may use MS, MIS, MG, and PRED, which are instructions described with reference to FIG. 6. The compiler inserts MS at the end of a basic block and MG at the start of the basic block after scheduling a code. In MS, a mask value is applied during a run-time by PRED. FIG. 7 will now be described in terms of a code of the compiler. MS, MIS, and MG are added to each basic block. Then, PRED is added to a branch. A PRED value is generated before ending of the first basic block 705. For example, the mask value 735 of '0111' is generated. Also, MS and MIS are executed. The MS notifies a mask pool generator that the mask value 735 of '0111' generated according to PRED is a value (after 2 cycles) which is valid when the second basic block 710 is executed. Also, the MIS notifies the mask poll generator that a mask value of '1000' obtained via an 'and' operation performed on the mask value 730 of '1000' that is an inverted mask value of PRED and the mask value 725 of '1111' of the first basic block 705 that is currently activated is valid (after 11 cycles) after the third basic block 715 is executed. It is understood that exemplary embodiments are not limited to determining validity of a mask value after 2 or 11 cycles, and other numbers of cycles may also be used.

When the second basic block 710 is executed, MG reads a mask value having an address of the second basic block 710 from the mask pool generator. For example, the mask value 735 of '0111' set in the first basic block 705 is written to a storage. Also, a mask value of '0111' is deleted from the mask pool generator. PRED, MS, and MIS are executed when the second basic block 710 is ended. The mask value 740 is changed to the mask value 745 of '0001', and the mask value 745 of '0001' is stored in the mask pool generator according to MS. MIS stores the mask value 750 of '0110' obtained by performing an 'and' operation on '0111' and '1110' that is an inverted mask value of '0001', in the mass pool generator.

MG is executed in the third basic block 715, and the mask value 755 of '1001' obtained by performing an 'OR' operation on the mask value 730 of '1000' and the mask value 745 of '0001' is read from the mask pool generator and applied to a current mask. Then, the mask value 755 read from the mass pool generator is deleted from the mass pool generator. When the end basic block 720 is executed, the mask value 760 of '1001' and the mask value 750 of '0110' are read from the mass pool generator to be executed, and then the end basic block 720 is ended.

Figure 8:
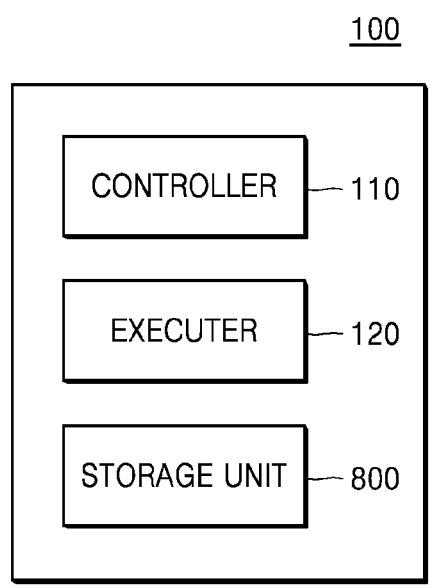
FIG. 8 is a block diagram of an apparatus for executing a multi-thread, according to another exemplary embodiment.

FIG. 8 is a block diagram of the apparatus 100 for executing a multi-thread, according to another exemplary embodiment. Referring to FIG. 8, the apparatus 100 includes the controller 110, the executer 120, and a storage unit 800 (e.g., storage).

The controller 110 may set a mask value indicating execution of a thread of a processor by using an instruction. Also, the controller 110 may set an inverted mask value by using the set mask value.

The executer 120 may execute the thread of the processor by using the set mask value or the set inverted mask value. The executer 120 may delete the stored mask value or the stored inverted mask value.

The storage unit 800 may store the set mask value or the set inverted mask value.

The device or apparatuses described herein may include a processor, a memory for storing program data and executing the stored program data, a permanent storage such as a disk drive, a communications port for handling communications with external devices, and user interface devices, including a display, keys, etc. When software modules are involved, the software modules may be stored as program instructions or computer-readable codes executable on the processor on a computer-readable media such as read-only memory (ROM), random-access memory (RAM), CD-ROMs, magnetic tapes, floppy disks, and optical data storage devices. The computer-readable recording medium may also be distributed over network coupled computer systems so that the computer-readable code is stored and executed in a distributed fashion. The computer-readable recording code may be read by the computer, stored in the memory, and executed by the processor.

One or more exemplary embodiments may be described in terms of functional block components and various processing steps. Such functional blocks may be realized by any number of hardware and/or software components configured to perform the specified functions. For example, the one or more exemplary embodiments may employ various integrated circuit components, e.g., memory elements, processing elements, logic elements, look-up tables, and the like, which may carry out a variety of functions under the control of one or more microprocessors or other control devices. Similarly, where the elements of the one or more exemplary embodiments are implemented using software programming or software elements, the exemplary embodiments may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the one or more exemplary embodiments could employ any number of conventional techniques for electronics configuration, signal processing and/or control, data processing and the like. The words "mechanism" and "element" are used broadly and are not limited to mechanical or physical exemplary embodiments, but may include software routines in conjunction with processors, etc.

The particular implementations shown and described herein are illustrative examples of certain exemplary embodiments and are not intended to otherwise limit the scope of the exemplary embodiments in any way. For the sake of brevity, conventional electronics, control systems, software development and other functional aspects of the systems (and components of the individual operating components of the systems) may not be described in detail. Furthermore, the connecting lines, or connectors, shown in the various figures are intended to represent exemplary functional relationships and/or physical or logical couplings between the various elements. It should be noted that many alternative or additional functional relationships, physical connections or logical connections may be present in a practical device.

The use of the terms "a", "an" and "the", and similar referents used in the context of describing the exemplary embodiments (especially in the context of the following claims), are to be construed to cover both the singular and the plural. Furthermore, disclosure of ranges of values herein are merely intended to serve as a shorthand method of referring individually to each separate value falling within the range, unless otherwise indicated herein, and each separate value is incorporated into the specification as if the individual value were individually disclosed herein. Finally, the operations of all methods described herein may be performed in any suitable order unless otherwise indicated herein or otherwise clearly contradicted by context. The use of any and all examples, or exemplary language (e.g., "such as") provided herein, is intended merely to better illuminate the exemplary embodiments and does not pose a limitation on the scope of the exemplary embodiments. Numerous modifications and adaptations will be readily apparent to those of ordinary skill in the art without departing from the spirit and scope of the exemplary embodiments.

What is claimed is:

1. An apparatus configured to execute a multi-thread comprising threads of a processor, the apparatus comprising:
a controller configured to set a mask value based on a group code, an operation (OP) code, cycle information and a compression method of an instruction among a plurality of instructions, and assign an instruction as a predicate for storing the mask value; and
an executer configured to execute one of the threads of the processor based on the predicate and the mask value,
wherein the compression method removes another instruction among the plurality of instructions, the other instruction lacking a function, and
wherein one or more instructions satisfying a predetermined criteria are grouped according to the group code, and the cycle information indicates a cycle to which a mask is to be applied.

2. A method of executing, by a processor, a multi-thread comprising threads of the processor, the method comprising:
setting a mask value indicating a first subset of the threads to be executed based on a group code, an operation (OP) code, cycle information and a compression method of an instruction;
setting an inverted mask value indicating a second subset of the threads to be executed based on the mask value;
assigning an instruction as a predicate for storing the mask value;
executing the first subset of the threads to be executed based on the mask value; and
executing the second subset of the threads to be executed based on the predicate and the inverted mask value,
wherein one or more instructions satisfying a predetermined criteria are grouped according to the group code, the cycle information indicates a cycle to which a mask is to be applied, and the compression method is to remove instructions that are not executed.

3. The method of claim 1, wherein the executing of the threads comprises executing the threads of the processor based on the mask value or the inverted mask value during the cycle indicated by the cycle information.

4. The method of claim 1, further comprising storing the mask value and the inverted mask value.

5. The method of claim 4, wherein the executing of the threads comprises executing the threads of the processor based on the mask value and the inverted mask value.

6. The method of claim 5, further comprising deleting the mask value and the inverted mask value after executing the threads.

7. The method of claim 1, wherein the instruction comprises a very long instruction word (VLIW).

8. The method of claim 1, wherein a quantity of the threads of the processor is 16 threads or less.

9. An apparatus configured to execute a multi-thread comprising threads of a processor, the apparatus comprising:
a controller configured to set a mask value indicating a first subset of the threads to be executed based on a group code, an operation (OP) code, cycle information and a compression method of an instruction, set an inverted mask value indicating a second subset of the threads to be executed based on the mask value, and assign an instruction as a predicate for storing the mask value; and
an executer configured to execute the first subset of the threads to be executed based on the mask value and execute the second subset of the threads to be executed based on the predicate and the inverted mask value,
wherein one or more instructions satisfying a predetermined criteria are grouped according to the group code, the cycle information indicates a cycle to which a mask is to be applied, and the compression method is to remove instructions that are not executed.

10. The apparatus of claim 9, wherein the executer is further configured to execute the threads of the processor based the mask value or the inverted mask value during the cycle indicated by the cycle information.

11. The apparatus of claim 9, further comprising a storage configured to store the mask value and the inverted mask value.

12. The apparatus of claim 11, wherein the executer is configured to execute the threads of the processor based on the mask value and the inverted mask value stored in the storage.

13. The apparatus of claim 12, wherein the controller is configured to delete the mask value and the inverted mask value from the storage.

14. The apparatus of claim 9, wherein the instruction comprises a very long instruction word (VLIW).

15. The apparatus of claim 9, wherein a quantity of the threads of the processor is 16 threads or less.

16. A non-transitory computer-readable recording medium having recorded thereon a program which, when executed by a computer, performs a method of executing, by a processor connected to the computer, a multi-thread comprising threads of the processor, the method comprising:
setting a mask value indicating a first subset of the threads to be executed based on a group code, an operation (OP) code, cycle information and a compression method of an instruction;
setting an inverted mask value indicating a second subset of the threads to be executed based on the mask value;
assigning an instruction as a predicate for storing the mask value;
executing the first subset of the threads to be executed based on the mask value; and
executing the second subset of the threads to be executed based on the predicate and the inverted mask value,
wherein one or more instructions satisfying a predetermined criteria are grouped according to the group code, the cycle information indicates a cycle to which a mask is to be applied, and the compression method is to remove instructions that are not executed.

* * * * *